US012667825B2

(12) United States Patent
Ahmed et al.

(10) Patent No.: US 12,667,825 B2
(45) Date of Patent: Jun. 30, 2026

(54) CHROMATOGRAPHIC COLUMN

(71) Applicant: KING SAUD UNIVERSITY, Riyadh (SA)

(72) Inventors: Ahmed Yacine Badjah Hadj Ahmed, Riyadh (SA); Mohamed Ali Ouladsmane, Riyadh (SA); Taieb Aouak, Riyadh (SA); Zeid Abdullah Alothman, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 60 days.

(21) Appl. No.: 18/112,806

(22) Filed: Feb. 22, 2023

(65) Prior Publication Data

US 2024/0278212 A1     Aug. 22, 2024

(51) Int. Cl.
| | |
|---|---|
| *B01J 20/286* | (2006.01) |
| *B01D 15/22* | (2006.01) |
| *B01J 20/26* | (2006.01) |
| *B01J 20/28* | (2006.01) |
| *B01J 20/30* | (2006.01) |
| *B01J 20/32* | (2006.01) |

(52) U.S. Cl.
CPC ............ *B01J 20/286* (2013.01); *B01D 15/22* (2013.01); *B01J 20/267* (2013.01); *B01J 20/28042* (2013.01); *B01J 20/3092* (2013.01); *B01J 20/3219* (2013.01); *B01J 2220/58* (2013.01); *B01J 2220/82* (2013.01); *B01J 2220/84* (2013.01); *B01J 2220/86* (2013.01)

(58) Field of Classification Search
None
See application file for complete search history.

(56) References Cited

U.S. PATENT DOCUMENTS

| | | | |
|---|---|---|---|
| 8,476,335 | B2 | 7/2013 | Huang et al. |
| 2004/0238447 | A1 | 12/2004 | Cheong |
| 2005/0061745 | A1 | 3/2005 | Xie et al. |

FOREIGN PATENT DOCUMENTS

| | | |
|---|---|---|
| CN | 105126793 A | 12/2015 |

OTHER PUBLICATIONS

"Chromatographic Columns," LibreTextsTM website, Apr. 27, 2019.: https://chem.libretexts.org/Bookshelves/Analytical_Chemistry/ Supplemental_Modules_(Analytical_Chemistry)/Instrumental_ Analysis/Chromatography/Chromatographic_Columns.

*Primary Examiner* — Kara M Peo
(74) *Attorney, Agent, or Firm* — Nath, Goldberg & Meyer; Joshua B. Goldberg

(57) ABSTRACT

The chromatographic column is a stainless steel column having a stationary phase of porous monolithic polymer chemically bonded to the interior wall of the stainless steel column so that the stationary phase is fixed and immobile and does not require frits or other seals to retain particulate matter or a slurry in the column. The inner wall of the column is oxidized and then vinylized with a difunctional linker to chemically bond the polymer to the column. The difunctional linker may be 3-(trimethoxysilyl) propyl meth-acrylate, vinyl trimethoxysilane, 3-mercaptopropyl trimethoxysilane, or glycidoxypropyltrimethoxysilane. The monolithic polymer is prepared in situ in the column by radical polymerization of a monovinyl monomer with a crosslinking divinyl monomer. The column may be a conventional stainless steel column (¼" inner diameter), capillary micro-LC (1/16"), or nan-LC ((1/32").

10 Claims, 6 Drawing Sheets

CHROMATOGRAPHIC COLUMN

BACKGROUND

1. Field

The disclosure of the present patent application relates to chromatography, and particularly to a chromatographic column made of stainless steel having a stationary phase of porous monolithic polymer chemically bonded to the stainless steel wall of the column for use in gas chromatography or high performance liquid chromatography.

2. Description of the Related Art

In liquid chromatography, the columns are the heart of the chromatographic system. Many research efforts aim to improve the existing columns and to develop new separation tools by preparation of more efficient stationary phases. The columns currently used in liquid chromatography for separation of samples are divided into two categories: packed columns which are prepared by filling a tube with fine and uniform particles, and monolithic columns, which were developed more recently and consist of a stationary phase made of a single-piece porous polymer. Monolithic materials are made of a continuous porous structure characterized by mesopores and macropores. These pores provide monoliths with high permeability, a large number of channels, and a high surface area available for reactivity. The backbone of monolithic columns is composed of either a porous organic or inorganic substrate; which can be chemically modified for specific applications. Their structure gives them several attractive physio-mechanical properties and makes them an excellent alternative to packed columns.

Commercially available packed HPLC columns include chemically modified high-purity silica particles filled in stainless steel tubes. In order to improve the efficiency and selectivity, the particle size has been continuously decreased over time. However, the reduced particle size induces a rapid increase of the column backpressure, such that recent ultra-high performance liquid chromatography (UHPLC) instruments can withstand a mobile phase pressure as high as 19,000 psi (>1,300 bar). Two types of monolithic columns are known: a first type wherein the monolithic material is prepared outside the column and is then introduced into the tubing by a cladding process under pressure; and a second type in which the monolithic stationary phase is synthesized inside the column, generally by a polymerization process, and chemically attached to the internal tubing surface. The second type of monolithic columns am fabricated inside fused silica capillary tubes, which are available in various sizes. Columns in a capillary format have a clear advantage over those with larger diameter that require cladding. By forming the columns within a capillary, the performance of the column can be evaluated without concern for factors arising from defects in cladding and damage to the monolithic phase.

FIG. 2 shows the typical column assembly 20 for connection of a fused silica capillary column 22 to an HPLC instrument or system. The fused silica capillary column 22 includes a stationary phase based on a monolithic polymer chemically bonded to the internal walls of the column 22. The inlet of the column 22 is connected to a six-port manual injector MI and its outlet is connected to a union connector 28, as known in the art. The column 22 inlet is covered by a polyether ether ketone (PEEK) tubing sleeve 26 extending from a PEEK fitting 24 that is finger-tightened to connect the column to a corresponding threaded injector port IP. The column outlet is similarly connected to the detector inlet using the union connector 28 and a sleeve 26, both of which are also made of PEEK. To avoid solvent leakage, the outer diameter of the column 22 is dimensioned to be close to the inner diameter of the PEEK sleeve 26. This type of connection is generally suitable for mobile phase pressures lower than 2,000 psi (138 bar). If air bubbles are observed or solvent leakage occurs due to higher pressures, the inlet or outlet connection can be tightened. However, overtightening PEEK parts can damage them or break the column ends. Although the preparation of these fused silica capillary columns is relatively easy and available to many laboratories, fused silica capillary tubes are fragile and therefore easily breakable; the capillary columns made of fused silica must be handled with care to avoid any bending or tension; as the monolithic stationary phase is chemically bonded to the fused silica internal surface, the column is susceptible to breakage when subjected to excessive pressure; and connecting the fused silica capillary column inlet and outlet to the HPLC system is delicate and requires special adaptors, sleeves and nuts, generally made of PEEK to avoid leakage and column damage. For these reasons, fused silica capillary columns are generally used for research purposes only and are not suitable for industrial sustained operation.

Thus, a chromatographic column solving the aforementioned problems is desired.

SUMMARY

The chromatographic column is a stainless steel column having a stationary phase of porous monolithic polymer chemically bonded to the interior wall of the stainless steel column so that the stationary phase is fixed and immobile and does not require frits or other seals to retain particulate matter or a slurry in the column. The inner wall of the column is oxidized and then vinylized with a difunctional linker to chemically bond the polymer to the column. The difunctional linker may be 3-(trimethoxysilyl) propyl methacrylate, vinyl trimethoxysilane, 3-mercaptopropyl trimethoxysilane, or glycidoxypropyltrimethoxysilane. The monolithic polymer is prepared in situ in the column by radical polymerization of a monovinyl monomer with a crosslinking divinyl monomer. The column may be a conventional stainless steel column ($\frac{1}{4}$" inner diameter), capillary micro-LC ($\frac{1}{16}$"), or nan-LC (($\frac{1}{32}$").

The chromatographic column is made by a method that includes three steps: activation of the internal surface of the stainless steel; grafting of a bifunctional linker on the column walls; and in situ synthesis of a porous polymer inside the column. The procedure is useful for preparation of various monolithic polymeric materials chemically attached to the internal wall of stainless steel tubes, with inner diameters ranging from 0.2 to 4.6 mm. The columns so produced have excellent mechanical and chemical stability and are therefore useful in many applications in liquid chromatography (conventional LC, micro-LC and nano-LC) as well as in gas chromatography. The stainless steel monolithic capillary column can be connected to and form part of a chromatography system using all stainless-steel components, thereby providing a robust system capable of long-term use.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The chromatographic column is a stainless steel column having a stationary phase of porous monolithic polymer chemically bonded to the interior wall of the stainless steel column so that the stationary phase is fixed and immobile and does not require frits or other seals to retain particulate matter or a slurry in the column. The inner wall of the column is oxidized and then vinylized with a difunctional linker to chemically bond the polymer to the column. The difunctional linker may be 3-(trimethoxysilyl) propyl methacrylate, vinyl trimethoxysilane, 3-mercaptopropyl trimethoxysilane, or glycidoxypropyltrimethoxysilane. The monolithic polymer is prepared in situ in the column by radical polymerization of a monovinyl monomer with a crosslinking divinyl monomer. The column may be a conventional stainless steel column (¼" inner diameter), capillary micro-LC (¹⁄₁₆"), or nan-LC ((¹⁄₃₂").

Figure 1:
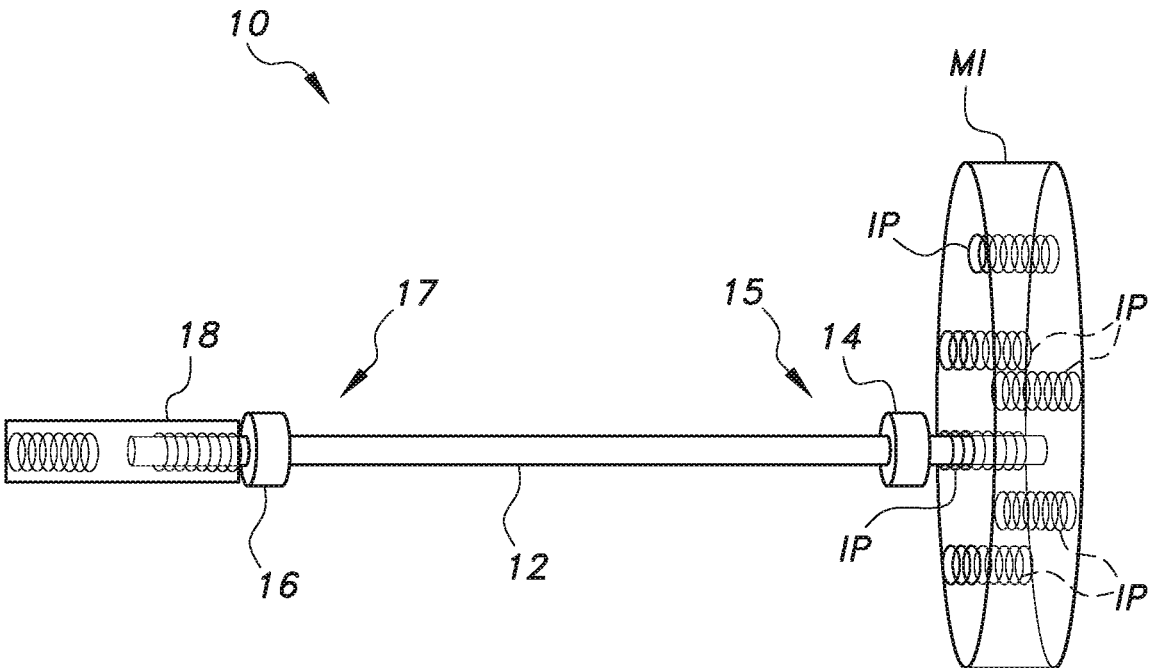
FIG. 1 is a diagrammatic environmental side view of a chromatographic column prepared as described herein shown connected to a chromatography system.
Figure 2:
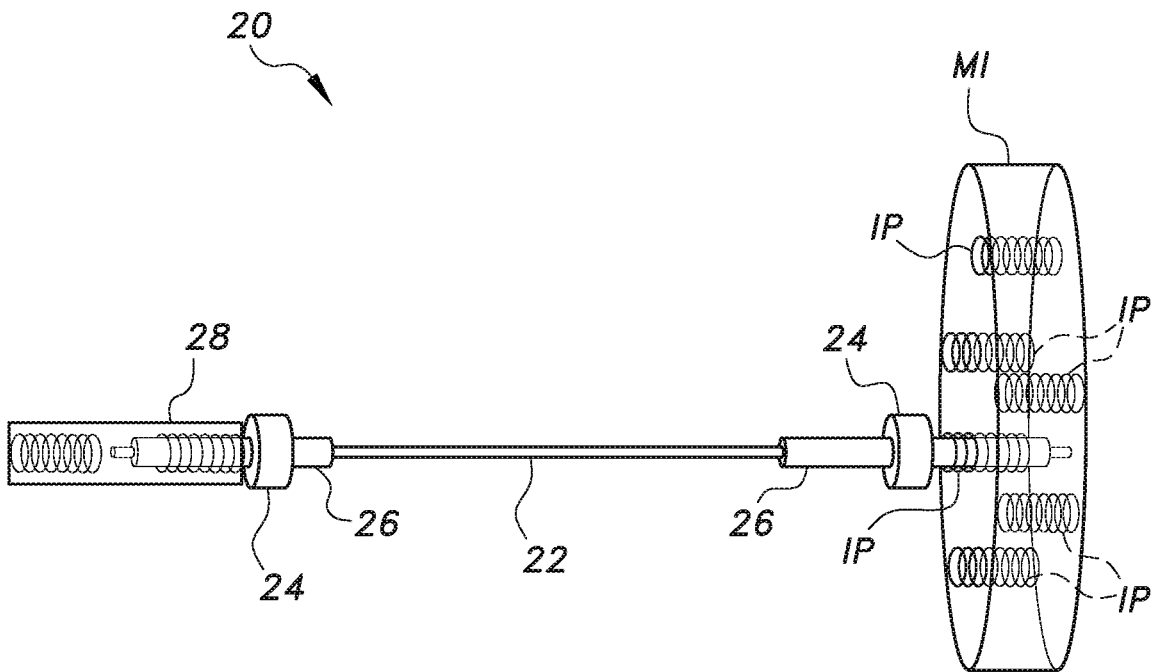
FIG. 2 is a diagrammatic environmental side view of a fused silica capillary column connected to a chromatography system according to the prior art.

FIG. 1 shows a stainless steel monolithic chromatographic column 12 connected to and forming part of a liquid chromatography system 10. The stainless steel monolithic capillary chromatographic column 12 includes a stationary phase based on a monolithic polymer chemically bonded to the internal walls of the tubular stainless steel column 12 according to the method described below. The column 12 includes an inlet 15, an outlet 17, an inner diameter (ID) and an outer diameter (OD). Using the method described below, the monolithic stationary phase can be prepared in situ within stainless steel capillary tubes, as well as inside conventional stainless steel columns, depending on the specific application. For example, suitable stainless steel tubing sizes include outer diameters of ¼", ⅛", ¹⁄₁₆" and ¹⁄₃₂", while different inner diameters are available for each size. Therefore, the methods make it possible to prepare monolithic columns in high performance liquid chromatography (HPLC) at different scales, such as conventional liquid chromatography (LC) (¼"), capillary micro-LC (¹⁄₁₆"), and nano-LC (¹⁄₃₂"). The inlet 15 of the column 12 is connected to a six-port manual injector MI and its outlet 17 is connected to a union connector 18. The inlet 15 is connected to a corresponding threaded injector port IP using an inlet fitting 14. The column outlet 17 is similarly connected to the detector inlet using the union connector 18 and an outlet fitting 16. The column 12, fittings 14, 16, and union connector 18 are all made of stainless steel. Thus, the connections are much easier than those used in fused silica columns and the risk of breakage and solvent leakage is minimized.

The chromatographic column 12 is made by a method that includes a polymerization process that is carried out in situ inside the stainless steel column 12 and includes difunctional vinyl linking molecules that are chemically attached to the internal stainless steel walls after oxidizing the stainless steel to produce a monolithic porous crosslinked polymer chemically bonded to the column and suitable for use as the stationary phase in HPLC.

In a first step, the empty stainless steel tube or column is rinsed with a concentrated sulfuric acid/hydrogen peroxide solution (3:1) (also known as a piranha solution or etch) for 5 minutes, and then left for 30 minutes at 70° C. This oxidizing treatment functionalizes the stainless steel surface and creates hydroxyl groups to allow its reaction with a suitable linker. The treated stainless steel column is then rinsed with a 6M sodium hydroxide solution for 10 min. and left for 3 hours at 97° C. It is than washed with distilled water for 10 minutes, followed by washing with a 1M hydrochloric acid (HCl) solution for 10 minutes and left with the same HCl solution for 1 hour at 70° C. Finally, the treated column is rinsed with distilled water and dried with nitrogen gas for 20 minutes at room temperature.

In a second step, the internal surface of the treated empty column is vinylized using a suitable difunctional linker solution at a preferred concentration ranging from 10 to 20% (v/v) in a polar solvent, such as an alcohol. This procedure allows chemical attachment of the monolithic polymer to the activated stainless steel surface and avoids any channeling at the interface between the monolithic polymer and the metal. Several difunctional agents are available for this purpose, such as 3-(trimethoxysilyl) propyl methacrylate, vinyltrimethoxysilane, 3-mercaptopropyl trimethoxysilane and glycidoxypropyltrimethoxysilane.

In a third step, the empty stainless steel column with its internal surface modified and functionalized by the above-described procedure is ready for in situ preparation of the single piece porous stationary phase. The organic polymeric monoliths are synthesized by radical polymerization of a mixture of monovinyl and crosslinking divinyl monomers. The process is initiated by thermal or UV light activation and may include an initiator. Various monomers are suitable for this preparation including acrylates, methacrylates, styrenes, acrylamides, and methacrylamides. Similarly, several divinyl monomers are suitable as a crosslinker, including divinylbenzene, ethylene dimethacrylate, glycerol dimethacrylate, N,N-methylene bisacrylamide, poly(ethylene) diacrylate, and bisphenol A dimethacrylate. The polymerization mixture is prepared in a suitable mixture of porogenic solvents, which are typically alcohols.

After preparation of the monolithic organic stationary phase, the stainless steel column is connected to an HPLC pump and thoroughly washed with acetonitrile to remove unreacted materials and porogenic solvents. To evaluate the mechanical stability of the prepared monolith, the mobile phase flow rate is increased step by step, and the back pressure is measured. The columns fabricated according to this procedure showed excellent resistance to pressures as high as 5400 psi (37 MPa). This result indicates that the cross-linked monolithic polymer is porous, mechanically stable, and well attached to the internal wall of the stainless steel column. The prepared column is ready for use. It can be connected to any HPLC instrument for characterization or analytical purpose.

Example 1

Effect of Flow Rate on Back Pressure

Figure 3:
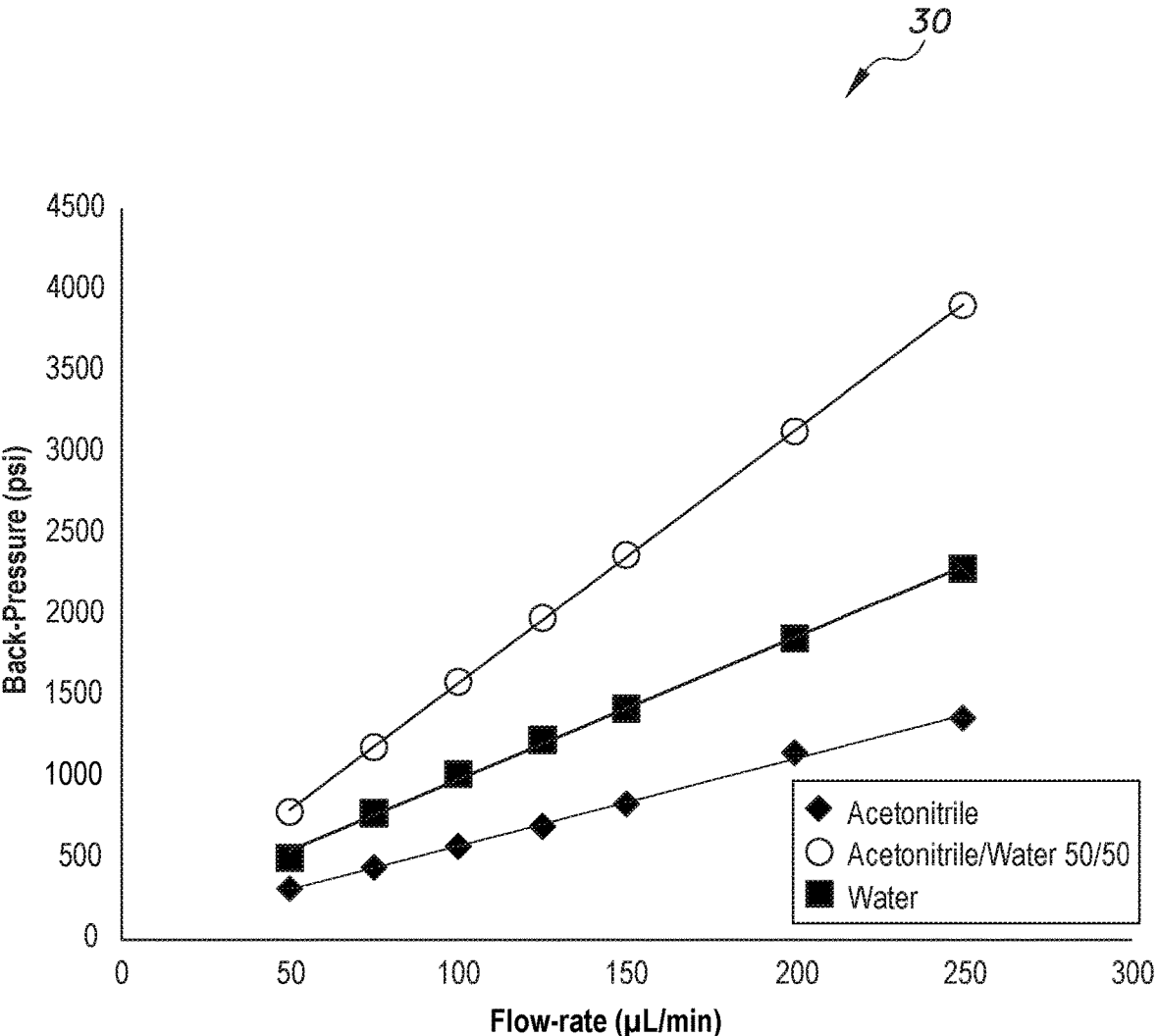
FIG. 3 is a plot of column backpressure versus mobile phase flow rate for a capillary chromatographic column prepared as described herein for various mobile phases.

A stainless steel tube with an OD of 0.0625", an ID of 0.030", and a length of 10 cm was prepared as described above with a monolithic stationary phase consisting of polystyrene crosslinked with divinylbenzene. FIG. 3 is a plot 30 of column backpressure versus mobile phase flow rate for the monolithic capillary chromatographic column using, sequentially, acetonitrile, water, and an acetonitrile/water mixture (50:50), respectively, as a mobile phase. In this experiment, the column had an outer diameter of $\frac{1}{16}$", an inner diameter of 0.03", a length of 3.93" (10 cm), a permeability on the order of $4\text{-}10\cdot10^{-14}$ $m^2$ and a porosity of $74\pm2\%$. FIG. 3 shows an excellent linear dependence of inlet pressure versus flow rate for acetonitrile, water, and their mixture. This result indicates that the porous monolithic polymer is mechanically stable and firmly attached to the stainless steel surface through the difunctional linker.

Figure 4:
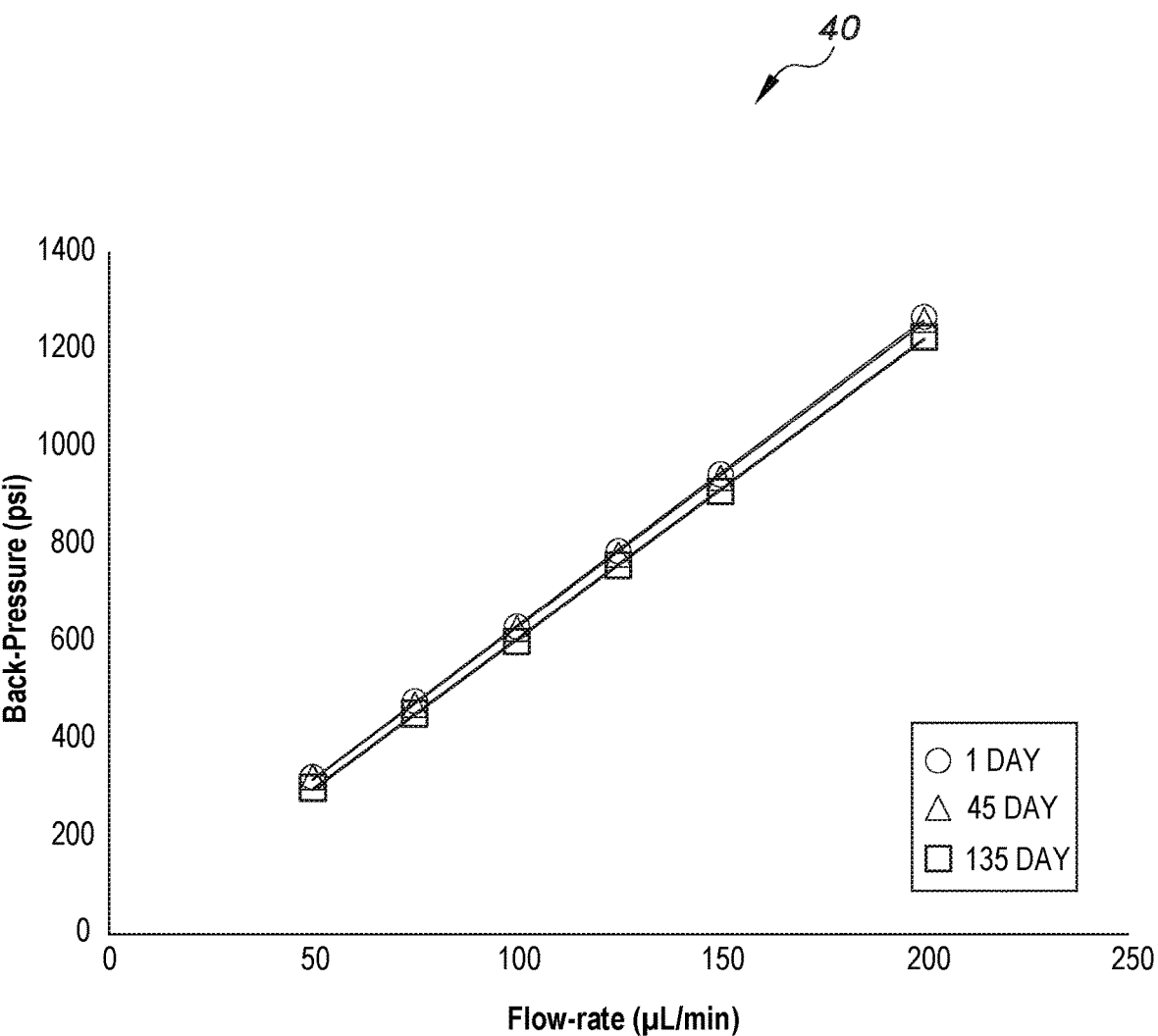
FIG. 4 is a plot of column backpressure versus mobile phase flow rate for a capillary chromatographic column prepared as described herein at intervals of 1 day, 45 days and 135 days, showing retention of mechanical stability over time.

The stability of the prepared columns over a long period of time was checked by measuring the back pressure after successive intervals. FIG. 4 is a plot 40 of column backpressure versus mobile phase flow rate for the stainless steel monolithic capillary column after 1, 45 and 135 days of use, using acetonitrile/water 40:60 (v/v %) as the mobile phase. In this experiment, the column had an outer diameter of $\frac{1}{16}$", an inner diameter of 0.03", a length of 3.93" (10 cm), a permeability on the order of 1.4 to $1.6\cdot10^{-19}$ $m^2$ and a porosity of $83\pm2\%$. The column backpressure remains remarkably constant, even after 135 days, for flow rates ranging between 50 and 200 µL/min.

Example 2

Separation of Compounds Under Different Conditions

Figure 5:
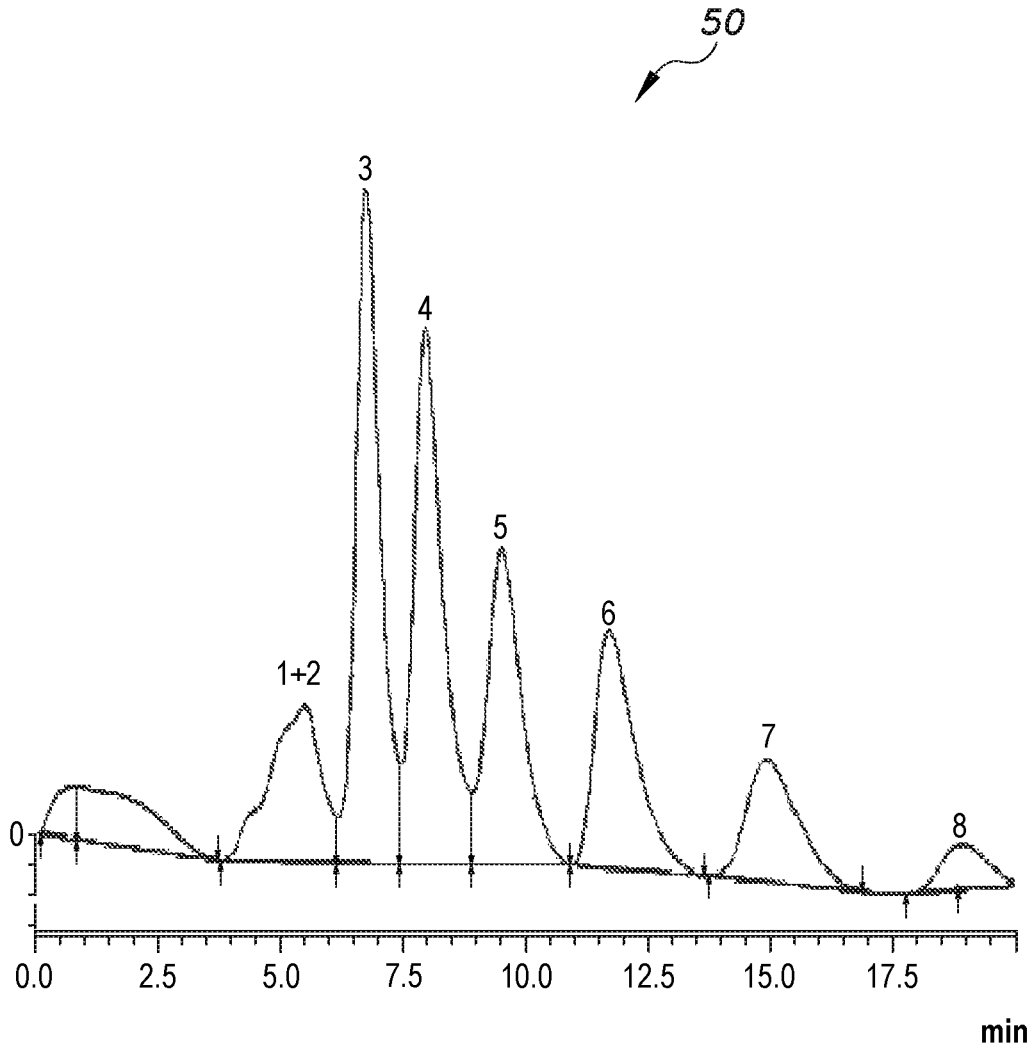
FIG. 5 is a chromatogram of a mixture of alkylbenzenes using a chromatographic column prepared as described herein using isocratic acetonitrile/water (45:55) as the mobile phase at a flow rate of 40 μL/min.

The prepared columns were chromatographically tested by injection of different series of standard solutes under various experimental conditions in reverse phase mode. For example, FIG. 5 shows a chromatogram 50 of a mixture of alkylbenzenes (from benzene to heptylbenzene) separated on the stainless steel capillary column with a monolithic polystyrene/divinylbenzene stationary phase, using isocratic acetonitrile/water (45:55) as the mobile phase. In this experiment, the column had an outer diameter of $\frac{1}{16}$", an inner diameter of 0.03", a length of 3.93" (10 cm), a permeability on the order of $6\text{-}10\cdot10^{-14}$ $m^2$, and a porosity of $75\pm2\%$. The flow rate was 40 µL/min. the pressure was 928 psi, the height equivalent to a theoretical plate (HETP) in µm was 122 (from 100 to 138), and a resolution factor of 1.28 (min), 1.82 (max) was obtained.

Figure 6:
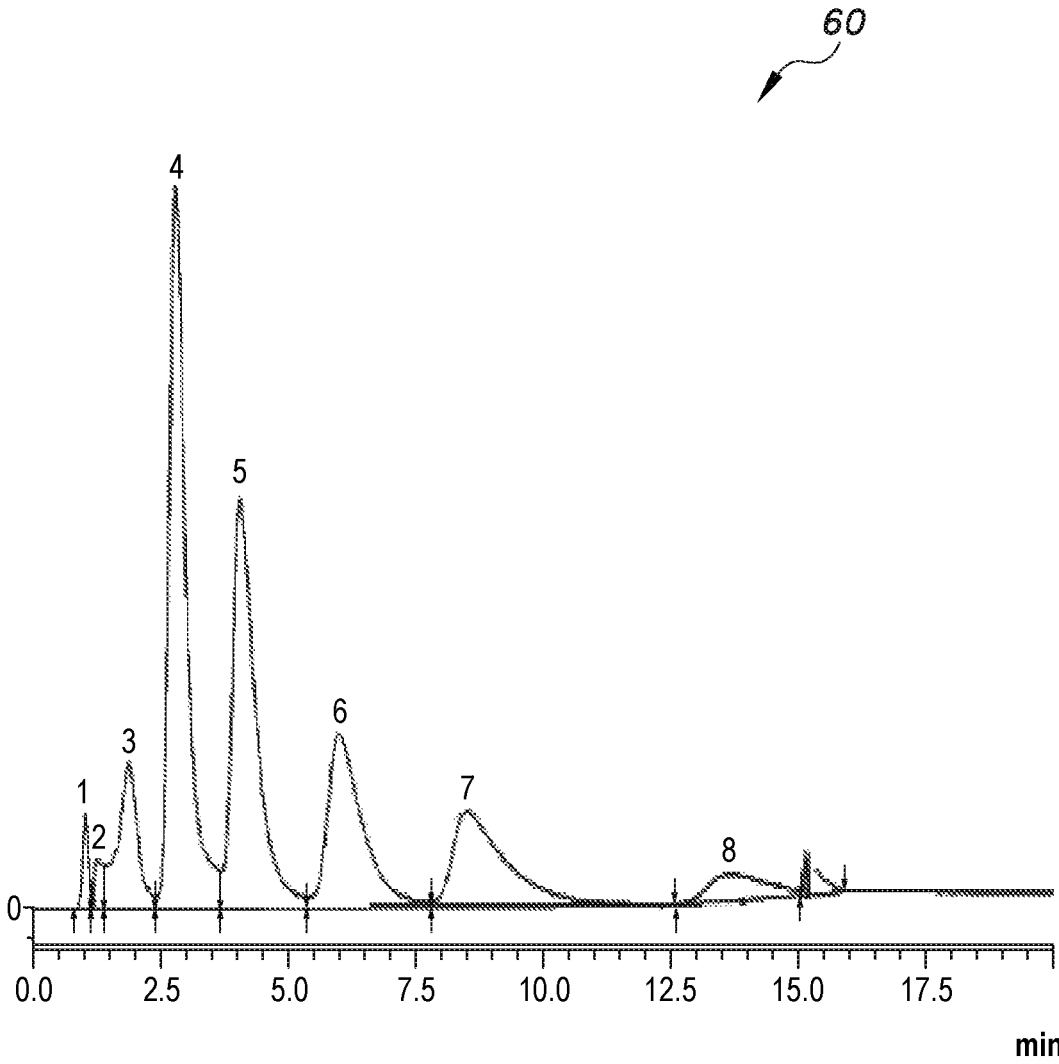
FIG. 6 is a chromatogram of a mixture of alkylbenzenes using a chromatographic column prepared as described herein using isocratic acetonitrile/water (30:70) as the mobile phase with a flow gradient varying the flow rate between 50-1000 μL/min.

FIG. 6 shows another example of a chromatogram 60 of a mixture of alkylbenzenes (from benzene to heptylbenzene) on the stainless steel capillary column with a monolithic polystyrene/divinylbenzene stationary phase, using a mixture of acetonitrile and water (30:70) in isocratic conditions as the mobile phase. In this experiment, the column had an outer diameter of $\frac{1}{16}$", an inner diameter of 0.03", a length of 3.93" (10 cm), a permeability on the order of $1\text{-}3\cdot10^{-13}$ $m^2$, and a porosity of $84\pm1\%$. The flow rate had a gradient from 50 to 1000 µL/min, the pressure ranged from 405 to 4985 psi, the HETP in µm was 279 (from 200 to 392), and a resolution factor of 0.62 (min) to 2.45 (max) was obtained. Although the inlet pressure was higher than 5000 psi, the stationary phase proved to be mechanically and chemically stable.

It is to be understood that the chromatographic column is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A chromatographic column, comprising:
a tubular stainless steel column having an inner surface; and
a porous monolithic polymer stationary phase chemically bonded to the inner surface of the stainless steel column;
whereby the stationary phase is fixed within the stainless steel column without frits and other seals to retain the stationary phase within the stainless steel column.

2. The chromatographic column according to claim 1, further comprising a difunctional linking compound bonded to the inner surface of said stainless steel column, said porous monolithic polymer being bonded to the difunctional linker compound.

3. The chromatographic column according to claim 2, wherein said difunctional linking compound is selected from the group consisting of 3-(trimethoxysilyl) propyl methacrylate, vinyl trimethoxysilane, 3-mercaptopropyl trimethoxysilane, and glycidoxypropyltrimethoxysilane.

4. The chromatographic column according to claim 1, wherein said porous monolithic polymer comprises a monovinyl monomer crosslinked with a divinyl monomer.

5. The chromatographic column according to claim 4, wherein said monovinyl monomer is selected from the group consisting of an acrylate, a methacrylate, a styrene, an acrylamide, and a methacrylamide.

6. The chromatographic column according to claim 4, wherein said divinyl monomer is selected from the group consisting of divinylbenzene, ethylene dimethacrylate, glycerol dimethacrylate, N,N-methylene bisacrylamide, poly(ethylene) diacrylate, and bisphenol A dimethacrylate.

7. The chromatographic column according to claim 1, wherein said porous monolithic polymer comprises polystyrene crosslinked with divinyl benzene.

8. The chromatographic column according to claim 1, wherein said stainless steel column has an outer diameter of $\frac{1}{4}$".

9. The chromatographic column according to claim 1, wherein said stainless steel column is a micro-capillary liquid chromatography column having an outer diameter of $\frac{1}{16}$".

10. The chromatographic column according to claim 1, wherein said stainless steel column is a nano-capillary liquid chromatography column having an outer diameter of $\frac{1}{32}$".

\* \* \* \* \*